United States Patent [19]

Kumura

[11] Patent Number: 4,853,858
[45] Date of Patent: Aug. 1, 1989

[54] CONTROL FOR CONTINUOUSLY VARIABLE TRANSMISSION

[75] Inventor: Haruyoshi Kumura, Kamakura, Japan

[73] Assignee: Nissan Motor Co., Ltd., Yokohama, Japan

[21] Appl. No.: 13,932

[22] Filed: Feb. 12, 1987

[30] Foreign Application Priority Data

Feb. 13, 1986 [JP] Japan .................................. 61-27937
Feb. 18, 1986 [JP] Japan .................................. 61-32022

[51] Int. Cl.$^4$ ..................... G06F 15/20; B60K 41/12
[52] U.S. Cl. .................................. 364/424.1; 74/866; 474/12; 474/18; 474/28; 364/165
[58] Field of Search ............... 364/424.1, 165; 74/866; 474/11, 12, 18, 28, 70

[56] References Cited

U.S. PATENT DOCUMENTS

| | | | |
|---|---|---|---|
| 4,576,265 | 3/1986 | Kumura et al. | 192/0.055 |
| 4,579,021 | 4/1986 | Yamamuro et al. | 74/869 |
| 4,597,308 | 7/1986 | Tanaka et al. | 74/866 |
| 4,653,004 | 3/1987 | Osanai et al. | 474/18 |
| 4,653,005 | 3/1987 | Osanai et al. | 474/18 |
| 4,670,843 | 6/1987 | Matsumura et al. | 364/424.1 |
| 4,702,128 | 10/1987 | Oshiage | 74/866 |
| 4,718,012 | 1/1988 | Oshiage | 364/424.1 |
| 4,729,103 | 3/1988 | Oshiage et al. | 364/424.1 |

FOREIGN PATENT DOCUMENTS 60-81560 5/1985 Japan .
2158898A 11/1985 United Kingdom .
2159218A 11/1985 United Kingdom .

Primary Examiner—Parshotam S. Lall
Assistant Examiner—V. N. Trans
Attorney, Agent, or Firm—Foley & Lardner, Schwartz, Jeffery, Schwaab, Mack, Blumenthal & Evans

[57] ABSTRACT

A control for a continuously variable transmission provides an improved transient performance by restraining proportional and integral terms when an error exceeds a predetermined value range. This is effective in suppressing an overshoot in driver pulley revolution speed in approaching to its target speed. This control is provided with a safeguard against break down of a vehicle speed sensor such that the above mentioned restrain is removed when the vehicle speed indicative signal should drop to zero during running of the vehicle.

15 Claims, 13 Drawing Sheets

TO STEP 601 OF FIG. 5(a)

CONTROL FOR CONTINUOUSLY VARIABLE TRANSMISSION

BACKGROUND OF THE INVENTION

The present invention relates to a control for a continuously variable transmission.

European Patent Application No. 83104182.7 published under publication No. 0092228 on Oct. 26, 1983 (corresponding to U.S. Pat. No. 4,597,308 issued to Tanaka et al. on July 1, 1986, our ref.: EPI35-82) discloses a system for controlling a reduction ratio of a continuously variable transmission of an automotive vehicle having an internal combustion engine. The continuously variable transmission has a V-belt running over a driver or input pulley and a driven or output pulley, a shift actuator, in the form of a stepper motor, movable to a plurality of operating positions, a source of hydraulic fluid pressure, a valve actuated by the shift actuator for regulating fluid supply to and fluid discharge from at least one of the driver pulley and driven pulley so as to establish a reduction ratio that is predetermined for one of the plurality of operating positions assumed by the shift actuator. Sensors are provided to detect operating conditions of the vehicle, including engine speed, throttle, and vehicle speed. The system includes a computerized control which carries out a method comprising the steps of:

determining a target reduction ratio to be established in the continuously variable transmission by table look-up of a table data based on throttle opening degree and vehicle speed;

determining a target pulse number indicative of a target operating position to be assumed by the shift actuator in order to establish the target reduction ratio;

generating as a parameter an actual pulse number that is set to zero when the largest reduction ratio is established in the continuously variable transmission;

varying the actual pulse number in such a direction as to reduce a difference between the target pulse number and actual pulse number; and moving the shift actuator toward the target operating position thereof in response to a variation in the actual pulse number.

The table data contains a zero target pulse number at a location having an address of zero vehicle speed for ease of moving the vehicle from a standstill so that the largest reduction ratio is established whenever the vehicle speed indicative signal is zero. In order to maintain one-to-one correspondance between the actual pulse number and the actual operating position of the shift actuator with good accuracy, the actual pulse number is set to zero whenever a shift reference switch is turned ON by the shift actuator upon assuming a predetermined operating position at which the largest reduction ratio is established in the continuously variable transmission. This known system contains a potential problem that a zero target pulse number is issued if the vehicle speed indicative signal becomes zero due to failure or trouble of the vehicle speed sensor. If the vehicle speed indicative signal should become zero during running of the vehicle, the transmission would be shifted down toward the largest reduction ratio, subjecting the vehicle to undesirable engine brake running. This may cause the engine to overrun if the vehicle is travelling at a high speed.

JP-A No. 59-75840 published on Apr. 28, 1984 (corresponding to European Patent Application No. 83110546.5 published under publication No. 0108315 on June 25, 1986, and to U.S. Pat. No. 4,576,265 issued to Kumura et al. on Mar. 8, 1986, our ref.: EP081-83) discloses a control system designed to execute not only a reduction ratio control, but also a start-up clutch control.

JP-A No. 60-81560 published on May 9, 1985 (corresponding to European Patent application No. 84122095.9 published under publication No. 0139277 on May 2, 1985 and U.S. patent application No. 659,678 filed Oct. 11, 1984, now U.S. Pat. No. 4,670,843 our ref.: EP096-84) discloses a feed-forward and feed-back control in order to improve transient performance of a continuously variable transmission wherein a feed-forward control or a feed-back control is selected in response to the absolute value of an error signal indicative of a difference between an actual pulse number and a target pulse number and a shift command signal is produced based on the selected one of them in moving the shift actuator to control a reduction ratio in the continuously variable transmission. The feed-forward control is carried out on a feed-forward control value determined by calculation, while the feed-back control is carried out on the sum of the feed-forward control value and a feed-back control value. The feed-back control value is the sum of a proportional term and an integral term. With this known control system, if the error signal is considerably increased during a transient state initiated by a great and rapid increase in throttle opening degree, the proportional term increases accordingly with the increase in the error signal and an overshoot occurs in a driver pulley revolution speed before reaching a new target driver pulley revolution speed set by the new throttle position. This overshoot takes place immediately before the completion of the transient state. The rate of change in driver pulley revolution speed during the occurrence of the overshoot is great, causing a noticeable change in output shaft torque which change is recognized as a substantial shock immediately before completion of the transient state.

Referring to FIG. 8, if the throttle is rapidly opened to cause a rapid and great increase in throttle opening degree (TH), a target driver pulley revolution speed (TRPM) set in correspondance with the throttle opening degree (TH) increases rapidly and greatly, and differs greatly from an actual driver pulley revolution speed (Nt). Thus, the actual driver pulley revolution speed deviates to the minus from the target driver pulley revolution speed. Under this condition, in order to increase the actual driver pulley revolution speed, there is a need to move a target shift actuator operating position (ND) toward the predetermined position where the largest reduction ratio is established by decreasing the target pulse number toward zero. The amount of decrease in the target pulse number is variable with the proportional term expressed by $Kp \times e$, where $Kp$ is a proportional gain and $e$ is an error and an integral term expressed by $Ki \times \int e \, dt$. If the amount of error $e$ is great during the transient state, the proportional term is substantial, so the target shift actuator operating position varies sharply, causing the shift actuator to change its direction of movement rapidly. As a result, the actual driver pulley revolution speed (Nt) overshoots before the completion of the transient state and output shaft torque curve varies greatly.

An object of the present invention is to improve proportional and integral control for a continuously variable transmission such that the continuously variable transmission can exhibit shockless transient performance in shifting from one steady state to another steady state. A further object of the present invention is to provide an improved control which is free from the before mentioned potential problem that is caused by breakdown or failure of a vehicle speed sensor.

SUMMARY OF THE INVENTION

A control for a continuously variable transmission for a vehicle is proposed which provides an improved transient performance by restraining proportional and/or integral terms when an error exceeds a predetermined value range. This is effective in suppressing an overshoot in driver pulley revolution speed in approaching to its target speed. Preferably, this control is provided with a safeguard against break down of a vehicle speed sensor such that the above mentioned restrain is removed when the vehicle speed indicative signal should drop to zero during running of the vehicle.

According to the present invention, there is provided a control for a continuously variable transmission of a vehicle, wherein the shift in reduction ratio in the transmission is controlled by a shift actuator. The control comprises the steps of:

detecting a vehicle speed of the vehicle and generating a vehicle speed indicative signal;

determining a feed-forward control value of the shift actuator in response at least to the vehicle speed indicative signal;

determining a target value of a predetermined variable indicative of the reduction ratio in the continuously variable transmission;

detecting an actual value of the predetermined reduction ratio indicative variable;

calculating an error between the target value and actual value;

determining a feed-back control value based on the error, said feed-back control value including a proportional term variable with the error as long as the error satisfies a predetermined condition, the proportional term staying invariable when the error fails to satisfies the predetermined condition; and controlling the shift actuator in response to said feed-forward and feed-back control values.

DETAILED DESCRIPTION OF THE INVENTION

Figure 1:
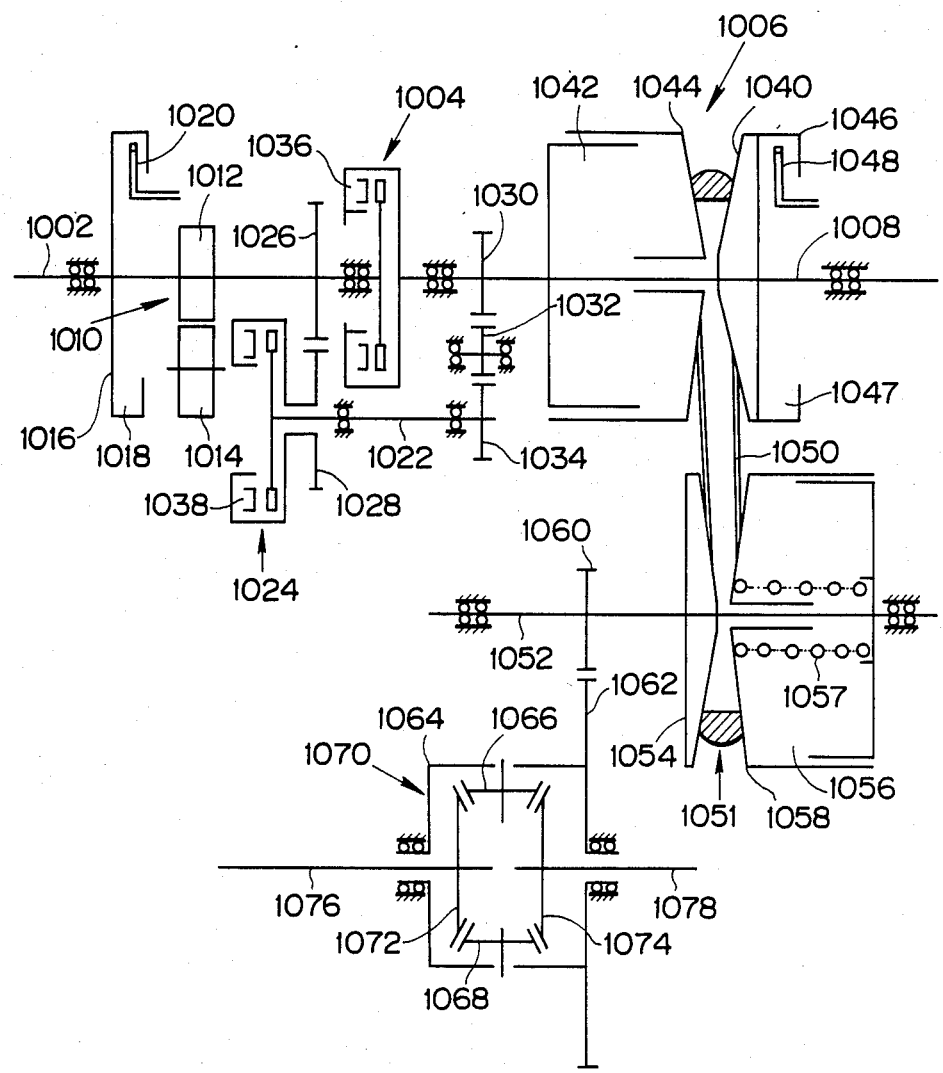
FIG. 1 is a diagrammatic view of a continuously variable V-belt transmission.

Referring to FIG. 1, a power transmission mechanism of a continuously variable V-belt transmission of an automotive vehicle is shown. An input shaft 1002 is driven by an engine having a throttle valve. The input shaft 1002 is connectable with a driver pulley 1006 via a hydraulic forward clutch 1004 for forward drive of the vehicle or via a hydraulic reverse clutch 1024 for reverse drive. The clutch 1004 has a cylinder chamber 1036 and starts engaging when a fluid pressure, i.e., an oil pressure, supplied to the cylinder chamber 1036 exceeds a predetermined value.

Figure 2A:
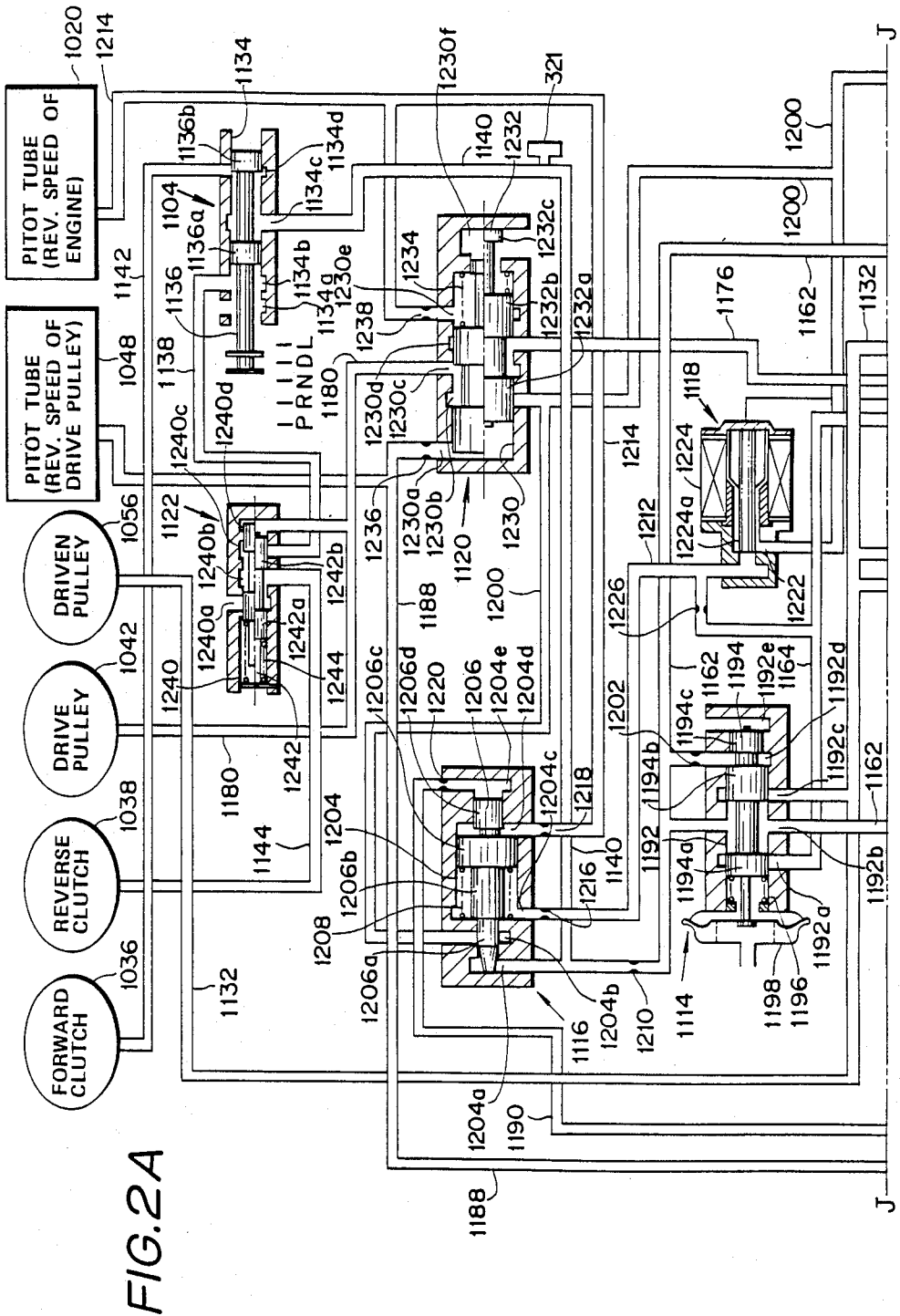
FIGS. 2A and 2B, when combined, illustrate a hydraulic control system.

The reverse clutch 1024 has a cylinder chamber 1038 and starts engaging when a fluid pressure, i.e., an oil pressure, supplied to the cylinder chamber 1038 exceeds a predetermined value. As shown in FIG. 2A, the forward clutch cylinder chamber 1036 is connected with a manual valve 1104 via an oil conduit 1142, while the reverse clutch cylinder chamber 1038 is connected with the manual valve 1104 via an oil conduit 1144, a reverse inhibitor valve 1122 and an oil conduit 1138. The manual valve 1104 admits an oil pressure in an oil conduit 1140 to the forward cylinder chamber 1036 when it is set in a "D" (forward drive) position, while it admits the oil pressure in the oil conduit 1140 to the reverse cylinder chamber 1038 when it is set in a "R" (reverse) position. The oil pressure in the oil conduit 1140 is generated by a starting valve 1116. The starting valve 1116 is responsive to an oil pressure in an oil conduit 1214 indicative of an engine revolution speed and a start adjustment oil pressure in an oil conduit 1212, generated by a start adjustment valve 1118 including a force motor 1224.

Figure 2B:
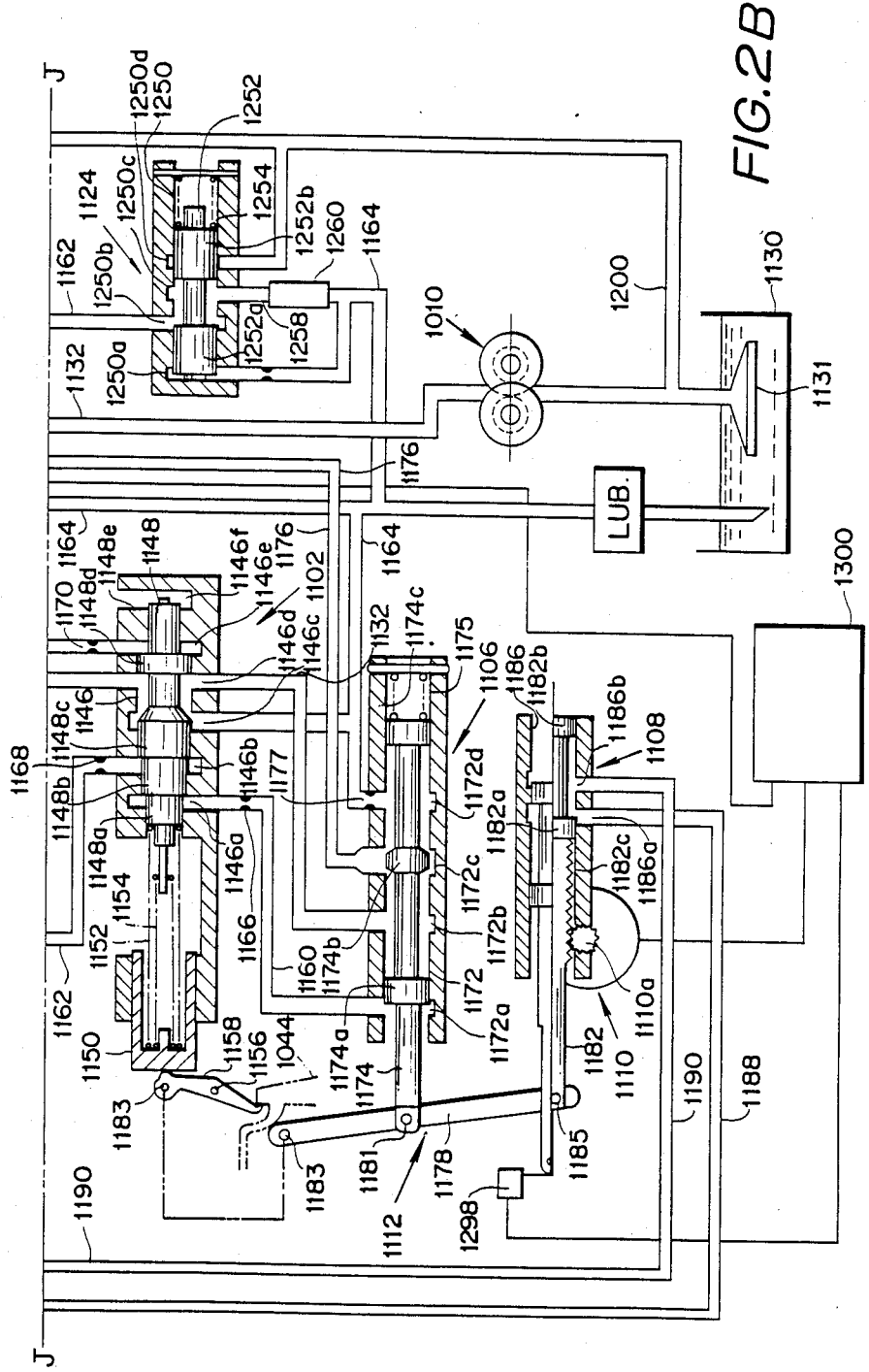

The detailed description of FIG. 1 and FIGS. 2A, 2B is found in European Patent Application No. 83104182.7 published under publication No. 0093413 on Nov. 9, 1983 (corresponding to U.S. Pat. No. 4,579,021 issued to Yamamuro et al. on Apr. 1, 1986; Our ref.: EP012-83). Particularly attention should be paid to description in connection with FIGS. 24 and 25A, 25B.

Description is made, hereinafter, regarding a control unit 1300 which controls actuation of a shift actuator in the form of a stepper motor 1110, and a force motor 1224.

Figure 3:
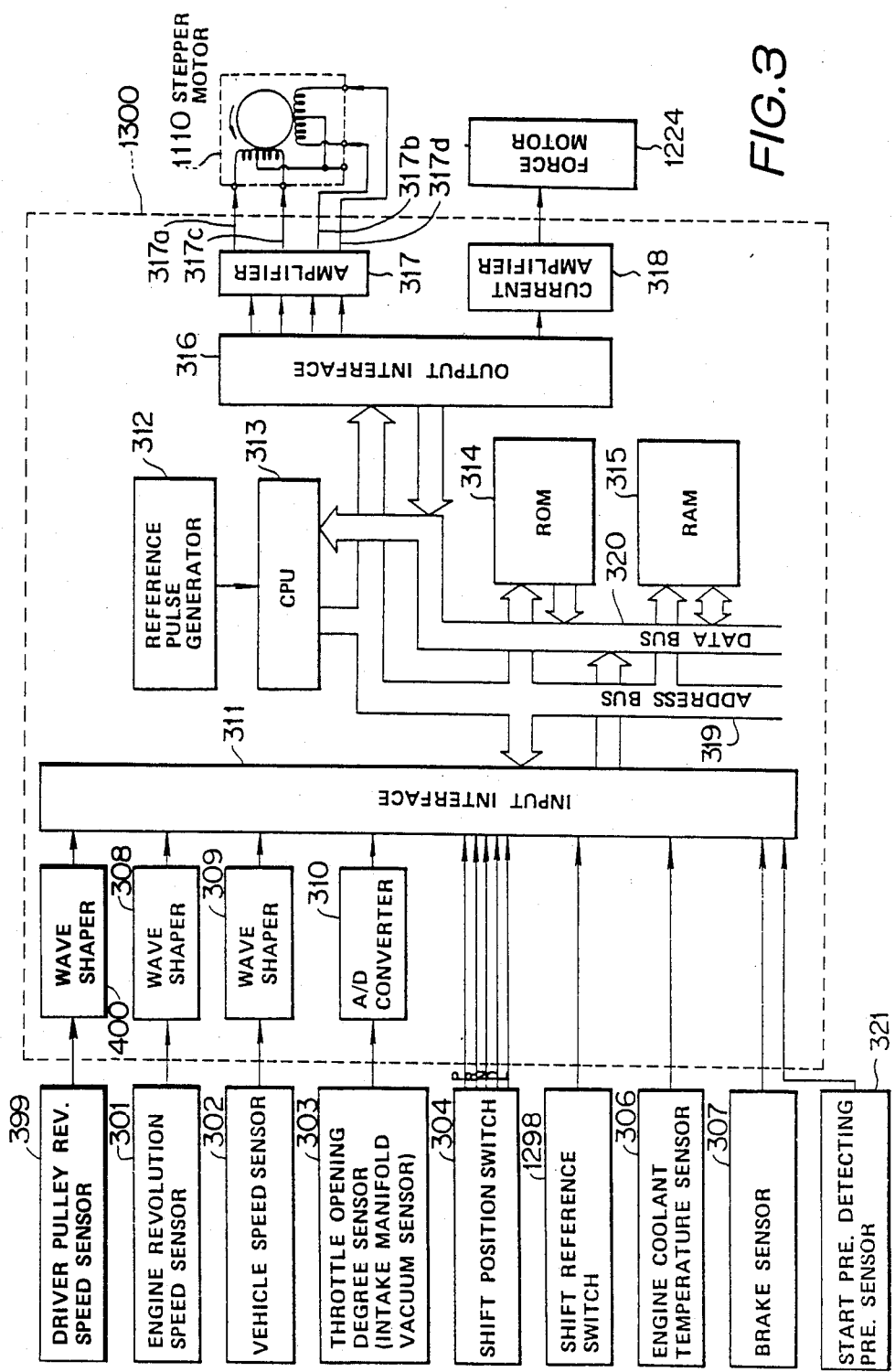
FIG. 3 is a block diagram showing an electronic control unit 1300 for controlling a stepper motor 1110 and a force motor 1224 shown in FIGS. 2A and 2B.

As shown in FIG. 3, the control unit 1300 receives as inputs thereto electric signals from a driver pulley revolution speed sensor 399, an engine revolution speed sensor 301, a vehicle speed sensor 302, a throttle opening degree sensor (or an intake manifold vacuum sensor) 303, a shift position switch 304, a shift reference switch 1298, an engine coolant temperature sensor 306, a brake sensor 307, and a start pressure detecting pressure sensor 321. The driver pulley revolution speed sensor 399 detects a driver pulley revolution speed of the driver pulley 1006. The engine revolution speed sensor 301 detects an engine revolution speed by measuring the number of ignition spark pulses of the engine, and the vehicle speed sensor 302 detects a vehicle speed by measuring the revolution of the output shaft of the continuously variable transmission. The throttle opening degree sensor (or intake manifold vacuum sensor) 303 detects the engine throttle opening degree in terms of an electric voltage signal (in the case of the intake manifold vacuum sensor, the intake manifold vacuum is detected in terms of an electric voltage signal). The shift position switch 304 detects which one of range positions, namely, P, N, D, and L, the before mentioned manual valve 1104 assumes. The shift reference switch 1298 is turned on when the sleeve 1182 of the before mentioned shift operating mechanism 1108 has come to a position corresponding to the largest reduction ratio. The engine coolant temperature 306 generates a signal when the engine coolant temperature is lower than a predetermined value. The brake sensor 307 detects whether or not the vehicle brake is used. The start pressure detecting pressure sensor 321 converts the start pressure in the above mentioned oil conduit 1140 into an electric signal. The signals generated by the driver pulley revolution speed sensor 399, engine revolution speed sensor 301 and vehicle speed sensor 302 are sent to an input interface 311 after passage through wave shapers 400, 308 and 309, respectively, and the electric voltage from the throttle opening degree sensor (or intake manifold vacuum sensor) 303 is converted at an A/D converter 310 into a digital signal before being sent to the input interface 311. The control unit 1300 includes the input interface 311, a reference pulse generator 312, a CPU 313, a ROM 314, a RAM 315, and an output interface 316, which are linked with each other by an address bus 319 and a data bus 320. The reference pulse generator 312 generates a reference pulse which actuates the CPU 313. The ROM 314 stores programs necessary for controlling the stepper motor 1110 and force motor 1224 and data necessary for controlling them. The RAM stores various parameters necessary for processing information from each of the sensors and switches and those necessary for control. Output signals from the shift control apparatus 1300 are sent out to the stepper motor 1110 and force motor 1224 via an amplifier 317 and. an electric current amplifier 318, respectively.

Hereinafter, a concrete explanation is made regarding the content of control carried out in the control unit 1300 in controlling the stepper motor 1110 and force motor 1224.

Figure 4:
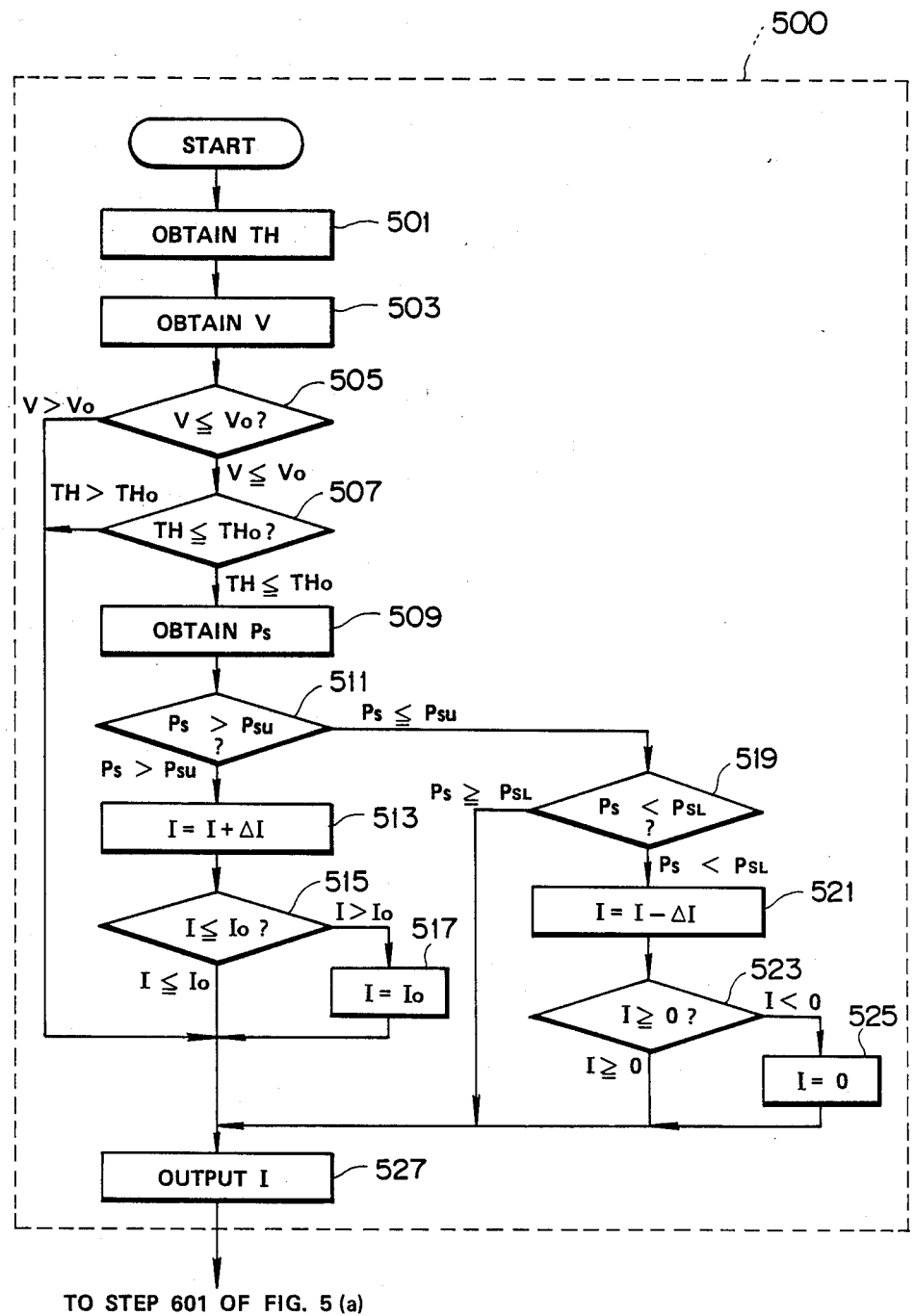
FIG. 4 is a flow chart of a force motor control routine 500.

The control may be divided into a force motor control routine 500, a complete engagement control routine 600 and a stepper motor control routine 700. First, the control of the force motor 1224 is described. The force motor control routine 500 is shown in FIG. 4. With the force motor control routine 500, the start pressure Ps is controlled by the start adjustment valve 1118 and starting valve 116 when the engine idles in order to put the forward clutch 1004 (or the reverse clutch 1024) in a predetermined state, such as, in a state right before initiation of the clutch engagement.

Figure 5A:
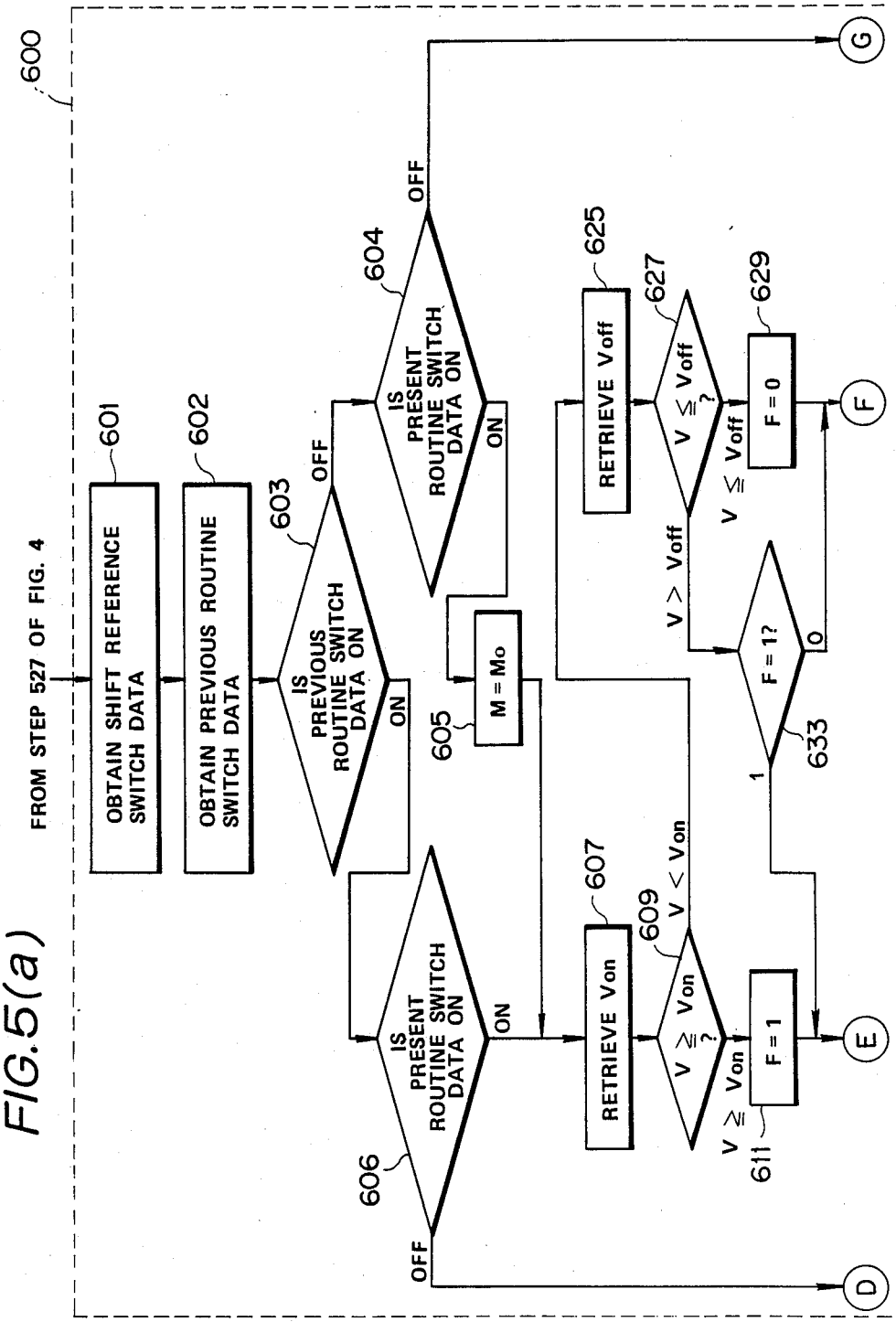
FIGS. 5(a) and 5(b), when combined, illustrate a flow chart of a complete engagement control routine 600.
Figure 5B:
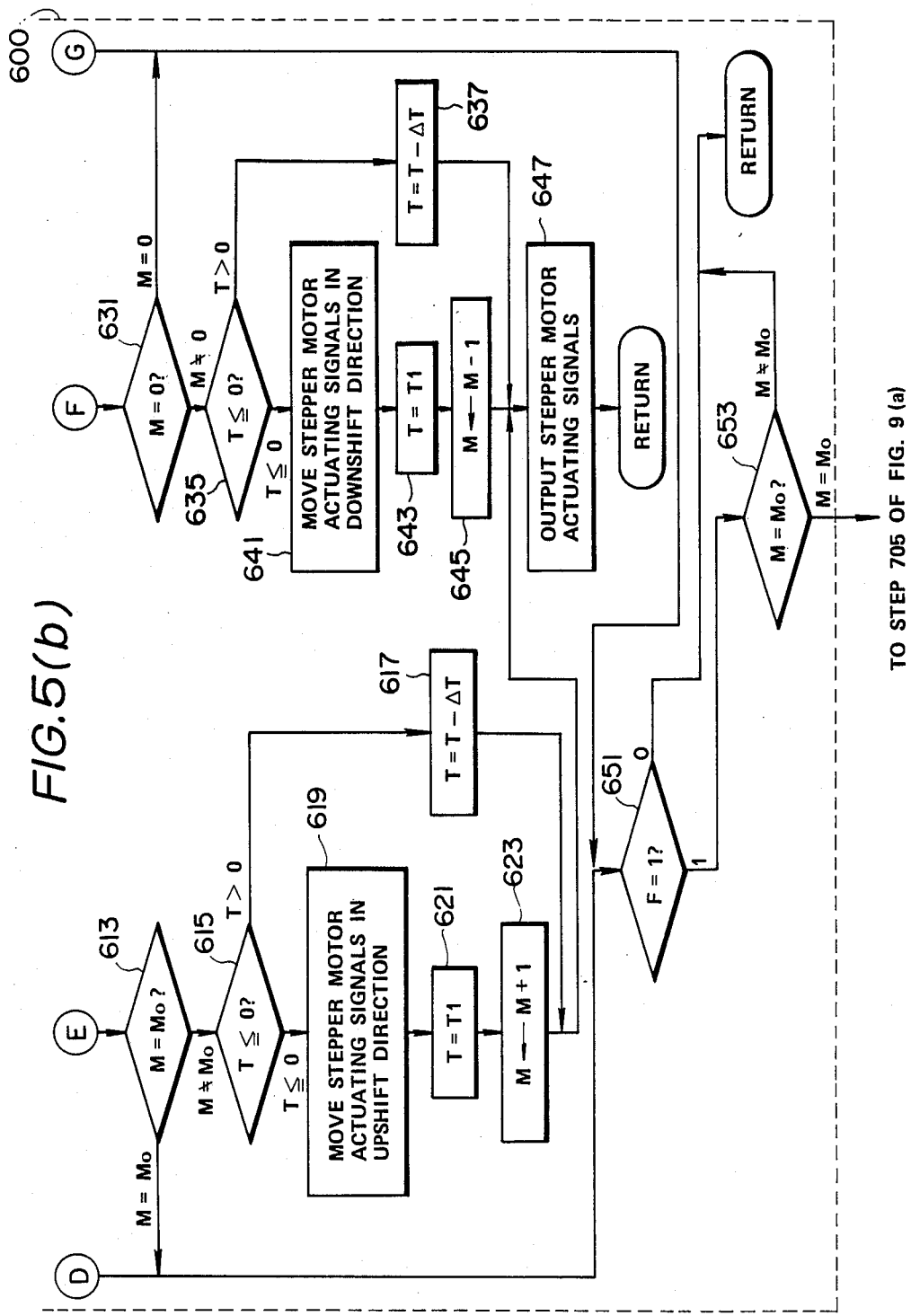

The complete engagement control routine 600 is shown in FIGS. 5(a) and 5(b). The complete engagement control routine 600 is executed following the step 527 of the above mentioned force motor control routine 500.

The detailed description of the force motor control routine 500 and complete engagement control routine 600 is found in European Patent Application No. 83110546.5 published under publication No. 008315 on June 25, 1986 (corresponding to U.S. Pat. No. 4,576,265 issued to Kumura et al. on Mar. 18, 1986).

Referring to FIGS. 6(a), 6(b), 6(c), and 6(d), a stepper motor control routine 700 is described. The execution of this stepper motor control routine is initiated following the execution of the complete engagement control routine 600.

In the following routine the throttle opening degree TH obtained in step 501 is used for the retrieval in step 902. In a step 705, a current shift position is read. In a step 707, it is determined whether the current shift position is D range. If the current shift position is identified as the D range, a desired or target driver pulley revolution speed TRPM is determined in step 902 by retrieval of a D range target revolution speed table based on the throttle opening degree TH. If the current shift position is not D range, the control proceeds from step 707 to a step 709 where it is determined whether the shift position is L range. If the shift position is L range, a target driver pulley revolution speed TRPM is determined in a step 904 by retrieval of a L range target revolution speed table based on throttle opening degree TH.

After the retrieval process in step 902 or 904, a vehicle speed Vs is read in a step 906. Then, a calculation is made to determine a steady-state reduction ratio to be established in the continuously variable transmission based on TRPM and Vs. Since there can be determined a stepper motor pulse number corresponding to any reduction ratio, a rotary position $\theta s$ to be assumed by the stepper motor can be expressed in terms of a stepper motor pulse number and thus determined based on TRPM and Vs. This value $\theta s$ is referred to as a feed-forward term. In a step 910, an actual driver pulley revolution speed Nt measured by driver pulley revolution speed sensor 39 is read. In a step 912, an error e, i.e., a difference between the target driver pulley revolution speed and the actual driver pulley revolution speed which is expressed by $e = Nt - TRPM$. In a step 913, it is determined whether vehicle speed Vs is equal to zero. If the vehicle speed Vs is equal to zero, the error e is set as $e_1$ in a step 915 before proceeding to a step 924. If the vehicle speed Vs is not equal to zero, comparison is made in a step 914 of the absolute value $|e|$ with a predetermined value $C_2$ in order to determine whether $|e|$ is not greater than $C_2$. The predetermined value $C_2$ is set to 300 rpm in this embodiment. If the absolute value $|e|$ is less than or equal to $C_2$, the error e is set as $e_1$ in a step 916 before proceeding to step 924. If the absolute value $|e|$ is greater than the predetermined value $C_2$. Comparison is carried out in a step 918 to find out whether the error e is positive or negative. If the error e is positive, $C_2$ is set as $e_1$ in a step 920 before proceeding to step 924. If the error e is negative, $-C_2$ is set as $e_1$ in a step 922 before proceeding to step 924.

In step 924, a proportional term P of a proportional and integral control algorithm is determined by multiplying a proportional gain Kp with $e_1$. The proportional term is variable in proportion to the error e.

In a step 926, a comparison is carried out of the absolute value $|e|$ with a second or another predetermined value $C_1$. This predetermined value $C_1$ is set equal to 500 rpm in this embodiment. If the absolute value $|e|$ is less than or equal to $C_1$, a constant Ki is multiplied with an integral of $e_1$ with respect to time dt to give an integral term I of the feed-back control algorithm. If the absolute value $|e|$ is greater than $C_1$, it is determined in a step 927 whether vehicle speed Vs is zero. If Vs is equal to zero, it is determined in step 931 whether the actual driver pulley revolution speed Nt is equal to zero. If the vehicle speed Vs is not equal to zero in step 927, the integral term I is set equal to zero in a step 930. If the vehicle speed Vs is equal to zero in step 927 and the actual driver pulley revolution speed Nt is equal to zero in step 931, the control proceeds to step 930. If the vehicle speed Vs is equal to zero and the actual driver pulley revolution speed Nt is not equal to zero in step 931. the error e is set as $e_1$ in a step 929 before proceeding to step 928. The processes performed in steps 926, 927, and 930 are such that the integral term I is set equal to zero when $|e|$ is greater than $C_1$ and the vehicle speed Vs is not equal to zero. The processes performed in steps 926, 927, 931, and 930 are such that the integral term I is set equal to zero, too, when $|e|$ is greater than $C_1$ after the vehicle has come to a halt. It will be understood that the vehicle speed Vs is zero and the driver pulley revolution speed Nt is zero under this condition. If there should occur a failure in vehicle speed sensor 302 and the vehicle speed indicative signal Vs drops to zero, the control would proceed to step 929 rather than step 930 because the driver pulley revolution speed Nt is not equal to zero while the vehicle is running.

After step 928 or 930, the control proceeds to a step 932 where the sum of I and P is set as Dpi. This value Dpi represents the amount of feed-back control. In a step 934, the sum of $\theta s$ and Dpi is set as a target pulse number ND or NL. ND represents a target pulse number for D range, while NL represents a target pulse number for L range. In step 936, it is determined whether ND or NL is negative. If it is negative in step 936, integration is terminated in a step 938 and then ND or NL is set equal to zero before proceeding to step 778. The setting is such that zero pulse number corresponds to the largest reduction ratio which can be established in the continuously variable transmission. If ND or NL is greater than zero in step 936, it is determined in step 942 whether ND or NL is greater than or equal to a predetermined value Hi. The predetermined value Hi indicates a pulse number corresponding to the smallest reduction ratio which can be established in the continuously variable transmission. If ND or NL is less than the predetermined value Hi, the control proceeds to step 778. If ND or NL is greater than or equal to the predetermined value Hi, integration is terminated in step 944 and then ND or NL is set equal to the predetermined value Hi in step 946 before proceeding to step 778.

As a result of processing the jobs in the above-mentioned steps, there is executed the following control. In step 908, the amount of feed-forward control $\theta s$, i.e., a steady state stepper motor position, is calculated. In step 924, the proportional term P of the feed-back control is calculated. In step 928, the integral term I of the feed-back control is calculated. Using the results of the above calculations, the amount of feed-back control Dpi is determined in step 932.

As shown in steps 914, 916 and 924, if $|e|$ is less than or equal to the predetermined value $C_2$, the proportional term P is given by the product of Kp and e. Thus, the proportional term P varies depending on the error e. As shown in steps 914, 918, and 920, if $|e|$ is greater than the predetermined value $C_2$, the proportional term P is given by the product of Kp and $C_2$ if the error e is positive. As shown in steps 914, 918, and 922, if $|e|$ is greater than the predetermined value and the error e is negative, the proportional term P is given by the product of Kp and $-C_2$. Thus, the absolute value of the proportional term P will not exceed a predetermined value that may be expressed by $Kp \times C_2$ even if the error e becomes great.

If the absolute value of the error $|e|$ is less than the predetermined value $C_1$, the integral term I is given by the product of Ki and $\int e\, dt$ (see steps 926 and 928). Thus, the integral term I varies in proportion to $\int e\, dt$. As shown in steps 927 and 930 or steps 927, 931, and 930, the integral term I is reset to zero if the absolute value of the error $|e|$ is less than the predetermined value $C_1$ and the vehicle speed sensor normally operates.

Therefore, when $|e|$ is less than the predetermined value $C_1$ and the predetermined value $C_2$, the amount of the feed-back control Dpi is given by the sum of the proportional term P and integral term I. In the case where $C_1$ is greater than $C_2$ like the present embodiment, when $|e|$ falls in a range defined between $C_2$ and $C_1$, the integral term I only varies even though the proportional term P stays invariable. When $|e|$ becomes greater than $C_1$, the value I is reset to zero and the integration is terminated so that further increase in the amount of the feed-back control is prevented. For the preceding reason, even if $|e|$ becomes very great, it is prevented to issue a command signal instructing an unnecessary large stepper motor pulse number as a target (ND or NL), thus preventing the tendency of driver pulley revolution speed to overshoot upon completion of a shift operation. This results in smooth variation in driver pulley revolution speed, providing shockless shift. The above explanation of the control may be confirmed by the following description in connection with FIG. 7.

Figure 7:
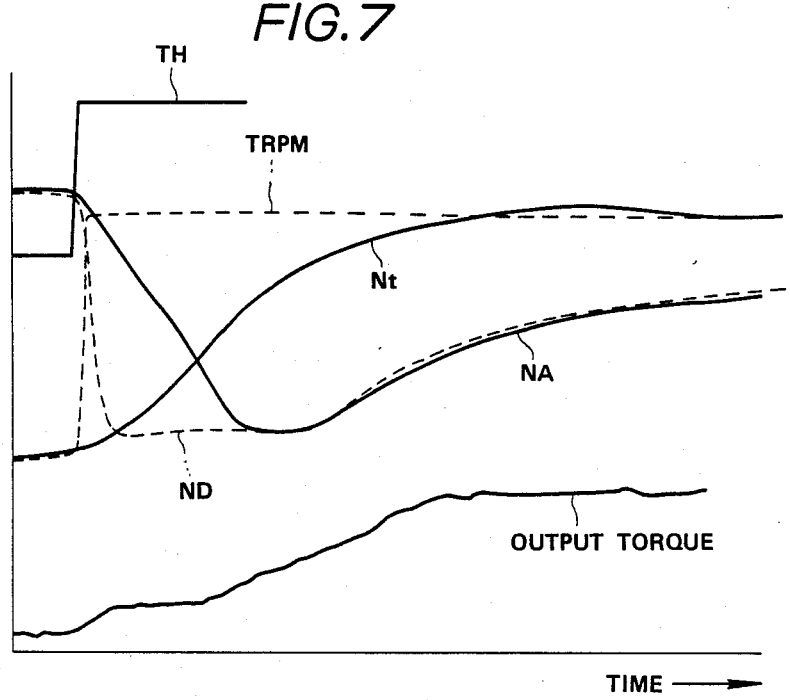
FIG. 7 is a time chart illustrating a transient performance provided by the control according to the present invention.
Figure 8:
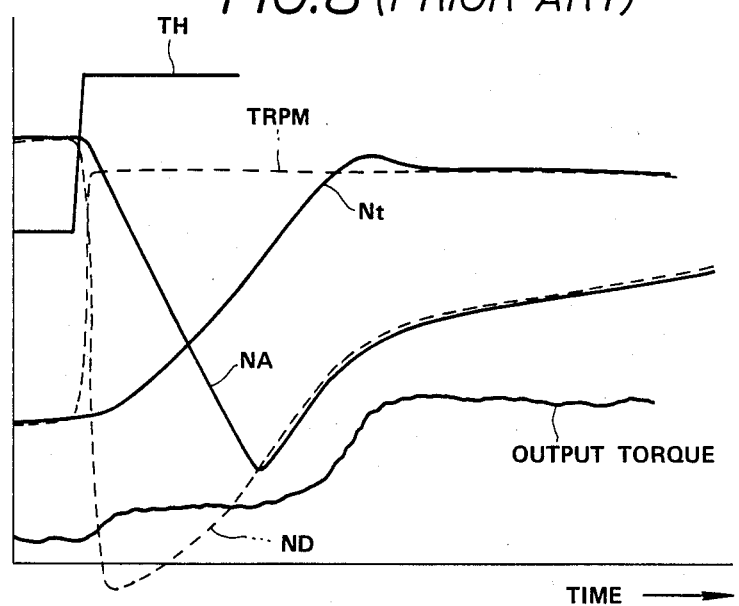
FIG. 8 is a similar chart illustrating the transient performance discussed before.

FIG. 7 shows a transient state initiated by a rapid and great increase in throttle opening degree TH. Comparing the transient performance according to the invention shown in FIG. 7 with the counterpart shown in FIG. 8, it will be understood that the target stepper motor position ND decreases less in the case of FIG. 7 than the target stepper motor position ND does in the case of FIG. 8. This causes smooth variation of the actual driver pulley revolution speed Nt in approaching the target driver pulley revolution speed TRPM without any noticeable overshoot.

Let us now consider the case where the vehicle speed indicative signal Vs has become zero during running of the vehicle due to break down of the vehicle speed sensor 302 or disconnection of cable. In this case, since the control proceeds from step 913 to step 915 where $e_1$ is set equal to the error e, the proportional and integral terms P and I determined in steps 915 and 928 are variable depending on the error e if $|e|$ is not greater than $C_1$. Even if it is greater than $C_1$, since the control proceeds along steps 927, 931, and 929 to step 928, the integral term I is calculated based on the error e.

Figure 9:
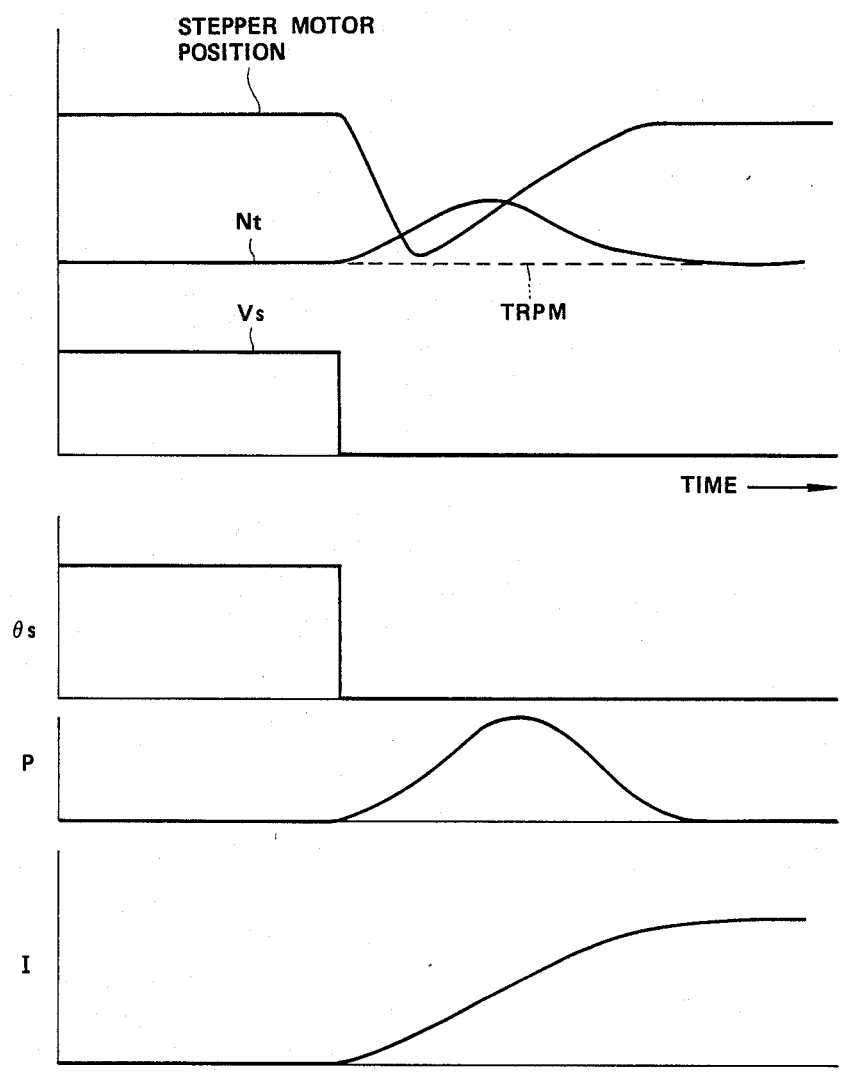
FIG. 9 is a time chart illustrating how the control according to the present invention reacts if the vehicle speed signal drops to zero while the vehicle is travelling at a high speed.

Since the error e is used for calculating the proportional and integral terms, the proportional and integral terms are present as long as the error e exists. Further description proceeds with reference to FIG. 9 which shows how stepper motor rotary position, driver pulley revolution speed, feed-forward control $\theta s$, proportional term P, and integral term I vary when the vehicle speed signal drops to zero during running of the vehicle. Assuming that the vehicle is travelling at a constant speed where the vehicle speed, throttle, and stepper motor rotary position are kept constant, if the vehicle speed signal drops to zero, the feed-forward control $\theta s$ drops to zero at the same time the vehicle speed signal drops to zero so that the stepper motor begins to move toward the largest reduction ratio and thus the actual driver pulley revolution speed Nt increases and deviates from the target driver pulley revolution speed TRPM. Since the error e calculated in step 912 increases and this result is used for calculation to determine the proportional and integral terms P and I, the proportional and integral terms P and I increase to compensate for a reduction in feed-forward control θs caused by the drop of vehicle speed signal Vs. As a result, as shown in FIG. 9, the driver pulley revolution speed Nt becomes under control and the engine overrun is prevented.

Turning back to FIGS. 6(a) to 6(d), it is hereinafter described how the control proceeds after determination of ND or NL.

After the data retrieval of the suitable pulse number data ND or NL in the corresponding step 720 or 740, a shift reference switch data is obtained from the shift reference switch 1298 in step 778 and then a determination is made whether the shift reference switch 1298 is in the on-state or the off-state in step 779. The shift reference switch data indicates whether the shift reference switch 1298 is turned on or off. If the shift reference switch 1298 is in the off state, the actual stepper motor pulse number data NA is retrieved from the RAM 315 in step 781. This pulse number data NA corresponds one to one to the actual rotary position of the stepper motor 1110 unless there is any electric noise. If, in the step 779, the shift reference switch 1298 is in on state, the pulse number data NA is given zero in step 780.

Figure 6A:
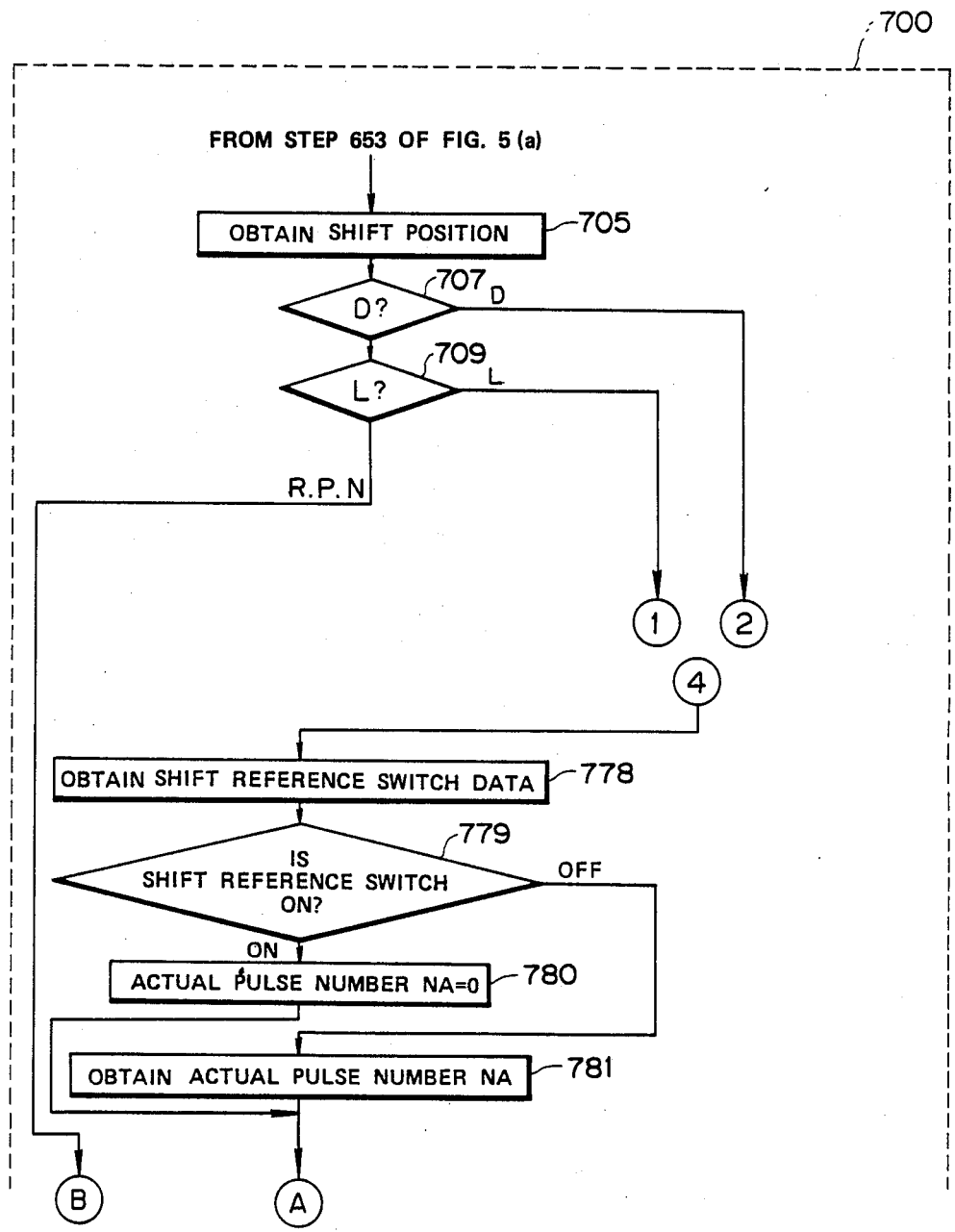
FIGS. 6(a), 6(b), 6(c), and 6(d), when combined, illustrate a stepper motor control routine 700.
Figure 6B:
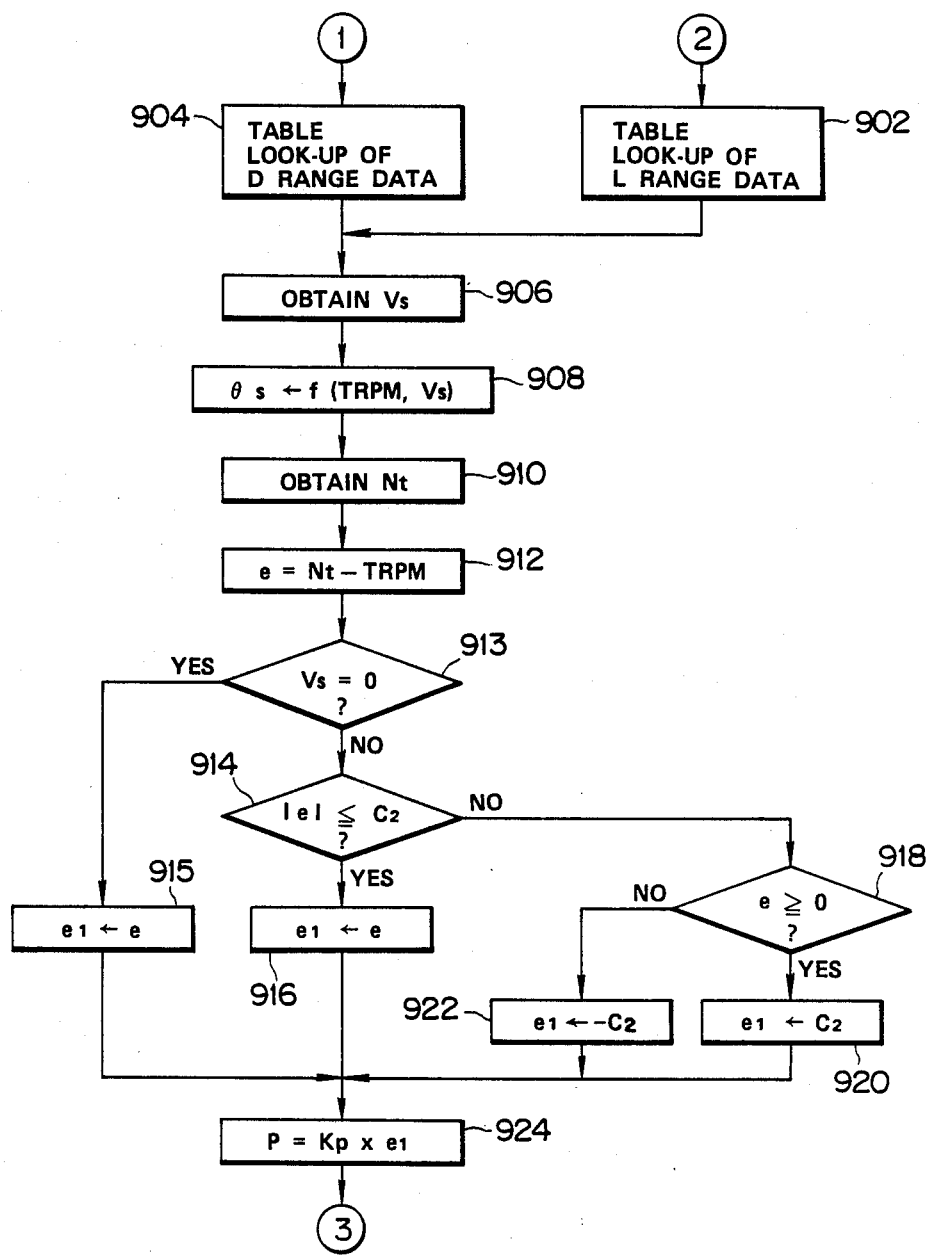
Figure 6C:
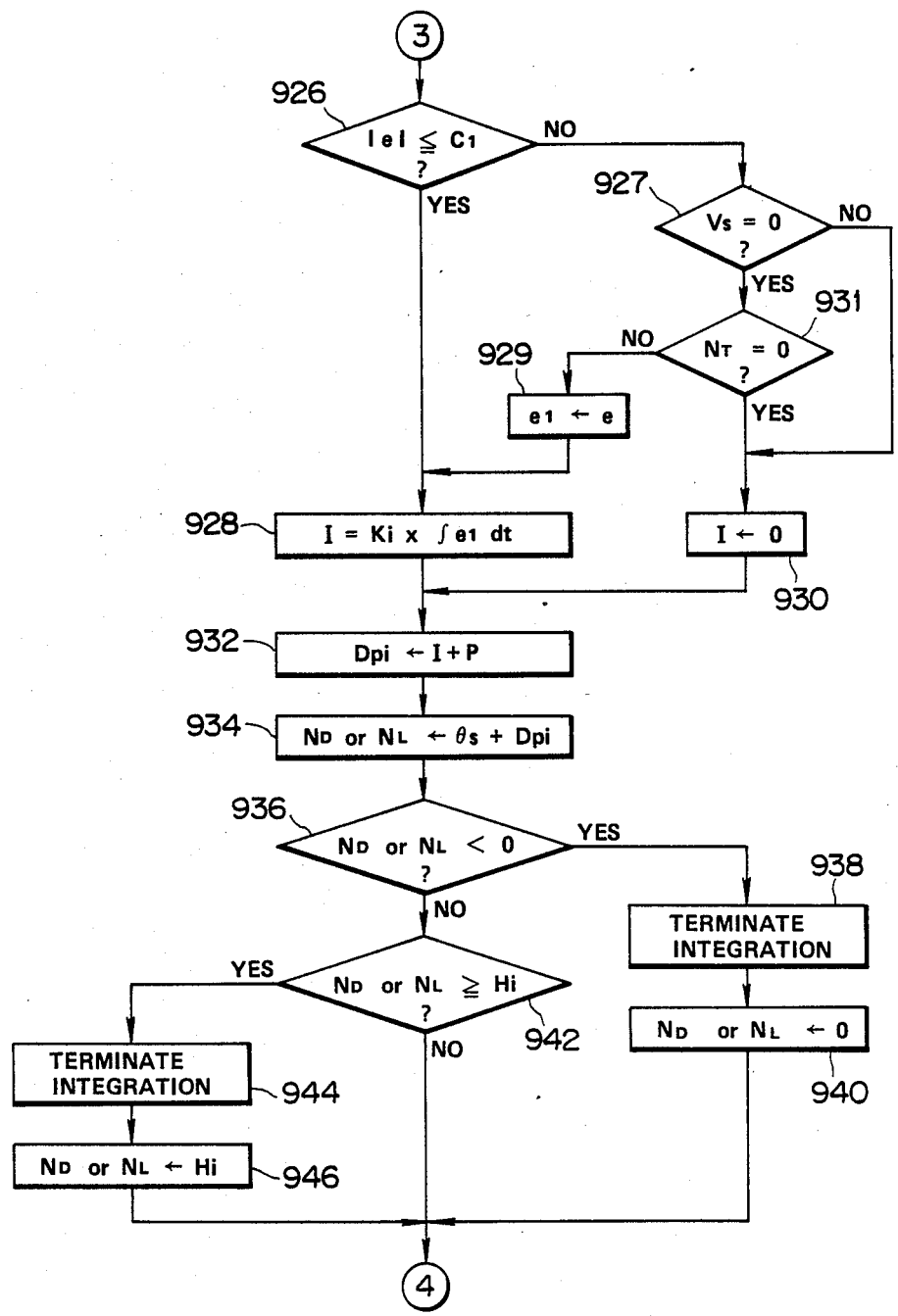
Figure 6D:
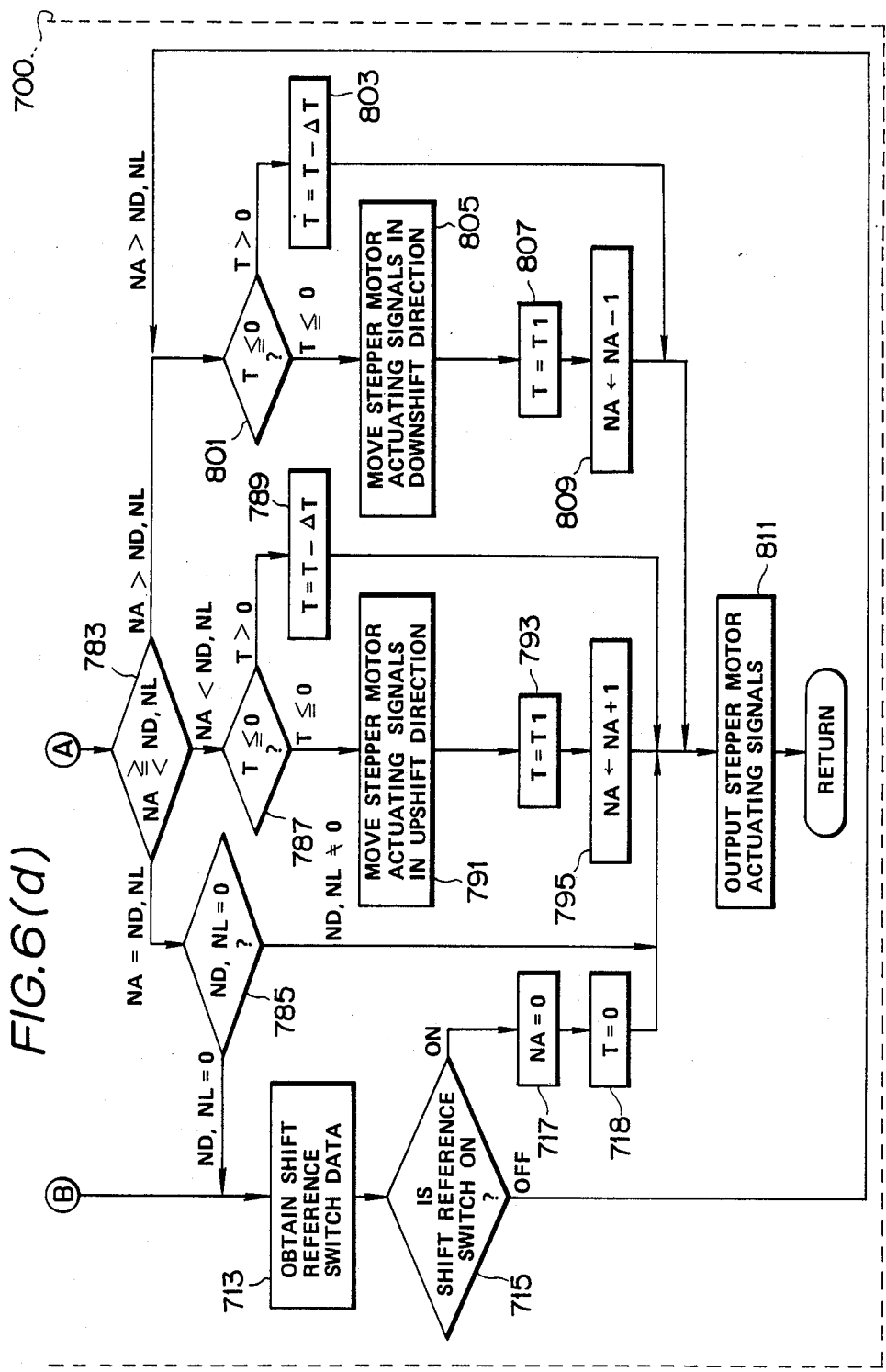

Referring to FIG. 6(d), if the actual pulse number data NA is equal to the desired pulse number data ND or NL as the result of step 783, a determination is made in step 785 whether the desired pulse number ND or NL is zero. In the case the desired pulse number ND or NL is not zero when the reduction ratio is not the largest, the same stepper motor actuating signals as provided for in the preceding run of this routine are sent out in step 811 before the program returns to START. If the desired pulse number ND or NL is zero in the step 785, the shift reference switch data is obtained from the shift reference switch 1298 in step 713, and a determination is made whether the shift reference switch 1298 is in the on state or the off state in step 715. If the shift reference switch 1298 is in the on state, the actual pulse number data NA is given zero in step 717, a stepper motor timer value T which will be described later is given zero in step 718, and then the same stepper motor actuating signals as those of the preceding run are sent out in step 811. If, in step 715, the shift reference switch 1298 is in the off state, the execution of the steps following the step 801 is initiated.

If, in the step 783, the actual pulse number NA is less than the desired pulse number ND or NL, the stepper motor 1110 needs to be actuated toward where the pulse number increases. First, a determination is made whether the timer value T is negative inclusive zero in step 787. If the timer value T is positive, then the timer value T is decreased by a predetermined value ΔT (delta T) in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 1110 are moved in the upshift direction by one stage in step 791 as described later. Then, the timer value T is given a predetermined positive value T1 in step 793. The stepper motor pulse number NA is increased by 1 in step 795, and the stepper motor actuating signals which have been moved by one stage in the upshift direction are sent out in step 811 before the program returns to START. This causes the stepper motor 1110 to rotate toward the upshift direction by one unit.

If, in step 783, the present stepper motor pulse number NA is greater than the desired pulse number ND or NL, a determination is made in step 801 whether the timer value T is zero or negative. If the timer value T is positive, the timer value T is decreased by the predetermined value ΔT (in step 803), and the same stepper motor actuating signals as those of the preceding routine are sent out in step 811 before the program returns to START. After repeating this sequence of operations, the timer value T becomes zero or negative after the elapse of a predetermined period of time because the decrement of the timer value T by the predetermined value ΔT is repeated. When the timer value T becomes zero or negative, the stepper motor actuating signals are moved toward a downshift direction by one stage in step 805. Then the timer value T is given the predetermined positive value T1 in step 807. The stepper motor pulse number data NA is decreased by 1 in step 809, and the stepper motor actuating signals having been moved in the downshift direction are sent out (in step 811) before the program returns to START. This causes the stepper motor 1110 to rotate in the downshift direction by one unit.

Description of the stepper motor actuating signals which are used in actuating the stepper motor 1110 and description of how to determine desired or target reduction ratio are found in European Patent Application No. 83104182.7 published under publication No. 0092228 on Oct. 26, 1983 (corresponding to U.S. Pat. No. 4,597,308 issued to Tanaka et al. on July 1, 1986, our ref.: EP135-82). Particular attention should be paid to description in connection with FIGS. 12, 13, and 14 to fully understand the stepper motor actuating signals, and particular attention should be paid to description in connection with FIGS. 15 to 19.

What is claimed is:

1. A control for a continuously variable transmission of a vehicle, wherein a shift in reduction ratio in the transmission is controlled by a shift actuator, the control comprising:

means for detecting a vehicle speed of the vehicle and generating a vehicle speed indicative signal;

means for determining a target value of a predetermined variable indicative of the reduction ratio in the continuously variable transmission;

means for detecting an actual value of the predetermined reduction ratio indicative variable;

means for determining a feed-forward control value of the shift actuator in response to at least said vehicle speed indicative signal;

means for calculating an error between said target value determined and said actual value detected, and for generating said calculated error as an error indicative signal when said calculated error falls in a first predetermined range which is defined by a first predetermined limit value and a second predetermined limit value, said error calculating means generating one of said first and second limit values as said error indicative signal when said calculated error fails to fall in said first predetermined range;

means for determining a feed-back control value based on said error indicative signal, said feed-back control value including a proportional term variable with said error indicative signal; and means for controlling the shift actuator in response to a sum of said feed-forward and feed-back control values.

2. A control as claimed in claim 1, wherein said feed-back control value further includes an integral term variable with a result from integrating said error indicative signal when said calculated error falls in a second predetermined range having a third limit value and a fourth limit value, said integral term being reset to zero when said calculated error fails to fall in said second predetermined range.

3. A control as claimed in claim 2, wherein said error calculating means generates said calculated error as said error indicative signal under a state where the vehicle speed indicative signal is zero, whereby should the vehicle speed indicative signal drop to zero when the vehicle is travelling at a high speed, a loss of the feed-forward control value due to the vehicle speed indicative signal being zero could be compensated for by the proportional and integral terms of the feed-back control value.

4. A control as claimed in claim 2, wherein said calculated error falls in said first predetermined range when the absolute value of said calculated error is not greater than a predetermined positive value, whereby the absolute value of each of said first and second limit values is equal to said first predetermined positive value.

5. A control as claimed in claim 4, wherein said calculated error falls in said second predetermined range when the absolute value of said calculated error is not greater than a second predetermined positive value, whereby the absolute value of each of said third and fourth limit values is equal to said second predetermined positive value.

6. A control as claimed in claim 5, wherein said predetermined variable indicative of the reduction ratio is a driver pulley revolution speed of the continuously variable transmission.

7. A control as claimed in claim 5, wherein said predetermined variable indicative of the reduction ratio is a reduction ratio of the continuously variable transmission.

8. A control for a continuously variable transmission of a vehicle, wherein a shift in reduction ratio in the transmission is controlled by a shift actuator, the control comprising:
  detecting a vehicle speed of the vehicle and generating a vehicle speed indicative signal;
  determining a target value of a predetermined variable indicative of the reduction ratio in the continuously variable transmission;
  detecting an actual value of the predetermined reduction ratio indicative variable;
  determining a feed-forward control value of the shift actuator in response to at least said vehicle speed indicative signal;
  calculating an error between said target value determined and said actual value detected;
  generating said calculated error as an error indicative signal when said calculated error falls in a first predetermined range which is defined by a first predetermined limit value and a second predetermined limit value, and generating one of said first and second limit values as said error indicative signal when said calculated error fails to fall in said first predetermined range;
  determining a feed-back control value based on said error indicative signal, said feed-back control value including a proportional term variable with said error indicative signal; and
  controlling the shift actuator in response to a sum of said feed-forward and feed-back control values.

9. A control as claimed in claim 8, wherein said feed-back control value further includes an integral term variable, with a result from integrating said error indicative signal when said calculated error falls in a second predetermined range having a third limit value and a fourth limit value, said integral term being reset to zero when said calculated error fails to fall in said second predetermined range.

10. A control as claimed in claim 9, wherein said calculated error is generated as said error indicative signal under a state where the vehicle speed indicative signal is zero, whereby should the vehicle speed indicative signal drop to zero when the vehicle is travelling at a high speed, a loss of the feed-forward control value due to the vehicle speed indicative signal being zero could be compensated for by the proportional and integral terms of the feed-back control value.

11. A control as claimed in claim 9, wherein calculated error falls in said first predetermined range when the absolute value of said calculated error is not greater than a predetermined positive value, whereby the absolute value of each of said first and second limit values is equal to said first predetermined positive value.

12. A control as claimed in claim 11, wherein said calculated error falls in said second predetermined range when the absolute value of said calculated error is not greater than a second predetermined positive value, whereby the absolute value of each of said third and fourth limit values is equal to said second predetermined positive value.

13. A control as claimed in claim 12, wherein said predetermined variable indicative of the reduction ratio is a driver pulley revolution speed of the continuously variable transmission.

14. A control for a continuously variable transmission of a vehicle, wherein the continuously variable transmission includes a driver pulley with a driver pulley shaft, a follower pulley and a V-belt drivingly interconnecting the driver pulley and the follower pulley, and wherein a shift in reduction ratio in the continuously variable transmission is controlled by a shift actuator, the control comprising:
  means for detecting a vehicle speed of the vehicle and for generating a vehicle speed indicative signal;
  means for determining a target value of a driver pulley revolution speed of the driver pulley shaft and generating a target driver pulley revolution speed indicative signal which is indicative of said target value determined;
  means for detecting an actual value of a driver pulley revolution speed of the driver pulley shaft and generating an actual driver pulley revolution speed indicative signal indicative of said actual value detected;
  means for determining a feed-forward control value of the shift actuator as a function of said target driver pulley revolution speed indicative signal and said vehicle speed indicative signal;
  means for calculating an error between said target driver pulley revolution speed and said actual driver pulley revolution speed and for generating said calculated error as an error indicative signal when said calculated error falls in a first predetermined range which is defined by a first predetermined limit value and a second predetermined limit value under a condition where said vehicle speed indicative signal indicates a vehicle speed other than zero vehicle speed, said error calculating means generating one of said first and second limit values as said error indicative signal when said calculated error fails to fall in said first predetermined range under the condition where said vehicle speed indicative signal indicates a vehicle speed other than zero vehicle speed, said error calculating means generating said calculated error as said error indicative signal when said vehicle speed indicative signal indicates zero vehicle speed;

means for determining a feed-back control value based on said error indicative signal, said feed-back control value including a proportional term which is a product of a first predetermined constant and said error indicative signal, said feed-back control value including an integral term which is a product of a second predetermined constant and a result of integration of said error indicative signal when said calculated error falls in a second predetermined range which is defined by a third limit value and a fourth limit value, said integral term being a product of said second predetermined constant and a result of integration of said calculated error when said calculated error fails to fall in said second predetermined range under conditions where said vehicle speed indicative signal indicates zero vehicle speed and said actual driver pulley revolution speed indicative signal indicates a driver pulley revolution speed other than zero driver pulley revolution speed; and means for controlling the shift actuator in response to a sum of said feed-forward and feed-back control values.

15. A control method for a continuously variable transmission of a vehicle, wherein the continuously variable transmission includes a driver pulley with a driver pulley shaft, a follower pulley and a V-belt drivingly interconnecting the driver pulley and the follower pulley, and wherein a shift in reduction ratio in the continuously variable transmission is controlled by a shift actuator, the control method comprising the steps of:

detecting a vehicle speed of the vehicle and generating a vehicle speed indicative signal;

determining a target value of a driver pulley revolution speed of the driver pulley shaft and generating a target driver pulley revolution speed indicative signal indicative of said target value determined;

detecting an actual value of a driver pulley revolution speed of the driver pulley shaft and generating an actual driver pulley revolution speed indicative signal indicative of said actual value detected;

determining a feed-forward control value of the shift actuator as a function of said target driver pulley revolution speed indicative signal and said vehicle speed indicative signal;

generating an error between said target driver pulley revolution speed as an error indicative signal when said error falls in a first predetermined range which is defined by a first predetermined limit value and a second predetermined limit value under a condition where said vehicle speed indicative signal indicates a vehicle speed other than zero vehicle speed;

generating one of said first and second limit values as said error indicative signal when said error fails to fall in said first predetermined range under the condition where said vehicle speed indicative signal indicates a vehicle speed other than zero vehicle speed;

generating said error as said error indicative signal when said vehicle speed indicative signal indicates zero vehicle speed;

determining a proportional term of a feed-back control value by multiplying a first predetermined constant with said error indicative signal;

integrating said error indicative signal with respect to time;

determining an integral term of said feed-back control value by multiplying a second predetermined constant with a result of said integrating step when said error falls in a second predetermined range which is defined by a third limit value and a fourth limit value;

determining said integral term of said feed-back control value by multiplying said second predetermined constant with a result of said integrating step when said error fails to fall in said second predetermined range under conditions where said vehicle speed indicative signal indicates zero vehicle speed and said actual driver pulley revolution speed other than zero driver pulley revolution speed;

determining a sum of said feed-forward control value and said feed-back control value and generating a control signal indicative of said sum; and controlling the shift actuator in response to said control signal.

* * * * *